(12) United States Patent
Agnello

(10) Patent No.: US 8,074,972 B2
(45) Date of Patent: Dec. 13, 2011

(54) DEVICE FOR GAS-LIQUID CONTACTING

(75) Inventor: Joseph Agnello, Grand Island, NY (US)

(73) Assignee: UOP LLC, Des Plaines, IL (US)

( * ) Notice: Subject to any disclaimer, the term of this patent is extended or adjusted under 35 U.S.C. 154(b) by 789 days.

(21) Appl. No.: 12/141,578

(22) Filed: Jun. 18, 2008

(65) Prior Publication Data

US 2009/0315196 A1 Dec. 24, 2009

(51) Int. Cl.
*B01F 3/04* (2006.01)
(52) U.S. Cl. ............... 261/114.1; 261/114.5; 29/896.6
(58) Field of Classification Search ............ 261/114.1, 261/114.5; 29/896.6
See application file for complete search history.

(56) References Cited

U.S. PATENT DOCUMENTS

| | | | |
|---|---|---|---|
| 2,520,391 A * | 8/1950 | Findlay | 208/317 |
| 2,882,030 A * | 4/1959 | Zuiderweg | 261/110 |
| 2,994,404 A * | 8/1961 | Schifferly | 96/117.5 |
| 4,499,035 A | 2/1985 | Kirkpatrick et al. | |
| 5,223,183 A | 6/1993 | Monkelbaan et al. | |
| 5,382,390 A | 1/1995 | Resetarits et al. | |
| 5,531,884 A | 7/1996 | Johnson et al. | |
| 6,116,583 A | 9/2000 | Agnello | |
| 6,131,891 A | 10/2000 | Resetarits et al. | |
| 6,736,378 B2 | 5/2004 | Colic et al. | |
| 6,739,585 B1 | 5/2004 | Urbanski et al. | |
| 6,783,120 B2 | 8/2004 | Shakur et al. | |
| 7,232,115 B2 | 6/2007 | Sastry | |
| 2007/0126134 A1 | 6/2007 | Xu et al. | |
| 2007/0137482 A1 | 6/2007 | Xu et al. | |

* cited by examiner

*Primary Examiner* — Robert J Hill, Jr.
*Assistant Examiner* — Christopher P Jones
(74) *Attorney, Agent, or Firm* — Mark Goldberg

(57) ABSTRACT

One exemplary embodiment can be a device for a gas-liquid contacting apparatus. The gas-liquid contacting apparatus can include a member. The member can include:
   a non-breakable portion, and
   a breakable portion adapted for removal by application of an effective amount of force for creating one or more holes for a passage of a fluid there-through.

3 Claims, 4 Drawing Sheets

DEVICE FOR GAS-LIQUID CONTACTING

FIELD OF THE INVENTION

The field of this invention generally relates to a device for an apparatus for gas-liquid contacting.

DESCRIPTION OF THE RELATED ART

In a gas-liquid contacting apparatus, such as a fractionation distillation tower, distillation plates are employed. Typically, such plates are employed in a variety of industries, including hydrocarbon, chemical, and petrochemical processing. Plate features such as contacting area, downcomer design, and overall plate structure can affect mass and heat transfer between gases and liquids in the apparatus.

Often, initial operating ranges are changed to meet current operational demands. To meet these new operating requirements, the number of downcomers on the plates can be increased. Alternatively, downcomers can be initially supplied with some of the openings covered by a bolted blanking strip. Removing the blanking strip can increase the capacity of the downcomer.

However, these solutions generally suffer from several disadvantages. Changing the number of downcomers can be time consuming and may risk altering other design properties of the plate. Regarding the blanking strip, this solution can lack flexibility should the removal of the strip uncover too many holes and increase liquid passage too much. In addition, removing only some of the strips from some of the downcomers may create uneven distribution of liquid in the apparatus. Moreover, specialized tools for strip removal can require time and effort to adjust the plate capacity. During downtimes when such adjustments are typically made, generally it is highly desirable to make such alterations in capacity quickly to minimize the downtime to bring the unit back to operation. Thus, it would be desirable to find a more efficient and flexible method for altering plate capacity.

SUMMARY OF THE INVENTION

One exemplary embodiment can be a device for a gas-liquid contacting apparatus. The gas-liquid contacting apparatus can include a member. The member can include:
a non-breakable portion, and
a breakable portion adapted for removal by application of an effective amount of force for creating one or more holes for a passage of a fluid there-through.

Another exemplary embodiment can be an apparatus for gas-liquid contacting. The apparatus can include:
a gas-liquid contacting tray, and
a downcomer coupled to the gas-liquid contacting tray. The downcomer may include a member, typically in turn having a non-breakable portion, and a breakable portion adapted for removal by an application of an effective amount of force for creating one or more holes.

Yet another exemplary embodiment can be a process for increasing a capacity of a downcomer for a gas-liquid contacting apparatus. The process may include removing one or more breakable portions from a non-breakable member of the downcomer.

Generally, the embodiments disclosed herein provide a member with a fixed number of holes covered. The covered holes can prevent the passage of a fluid, such as a liquid, there-through. Moreover, the one or more discrete regions covering such holes may be easily removed to adjust the tray capacity. Particularly, simply punching out the one or more discrete regions can reveal more holes that may serve to transfer liquid from one tray to the next. Typically, the one or more discrete regions are removed with simple tools such as a hammer and, optionally, a punch.

DEFINITIONS

As used herein, the term "gas-liquid" contacting generally means the interaction of one or more gases and one or more liquids. The term "gas" can include a vapor. Usually, the gas-liquid contacting occurs on a tray where froth is created to facilitate the heat and mass transfer between the gas and liquid.

As used herein, the term "breakable" generally means a portion removable from a whole by the application of manual force by a human, usually using a manually-powered tool such as a hammer or mallet. Such a force is typically less than 20,000 newton, less than about 10,000 newton, even less than about 5,000 newton, or yet even less than about 2,000 newton.

As used herein, the term "non-breakable" generally means a portion that is not removable from a whole by the application of force by a human, usually using a manually powered tool such as a hammer or mallet. A "non-breakable" portion may be broken by using a a non-human powered machine such as a punch or stamp press.

As used herein, the term "perimeter" generally means a boundary of an object or region, and can be of any suitable shape, such as a circle, oval, square, diamond, rectangle, or irregular.

As used herein, the term "fluid" generally includes one or more gases and/or one or more liquids optionally in a solution or a suspension, e.g., vapor. In addition, the term "fluid" and "gas" can also include an aerosol, such as a suspension of liquid and/or solid particles in a gas.

As used herein, the term "coupled" can mean two items, directly or indirectly, joined, fastened, associated, connected, or formed integrally together either by chemical or mechanical means, by processes including stamping, molding, or welding. What is more, two items can be coupled by the use of a third component such as a mechanical fastener, e.g. a screw, a nail, a staple, or a rivet; an adhesive; or a solder.

DETAILED DESCRIPTION

Figure 1:
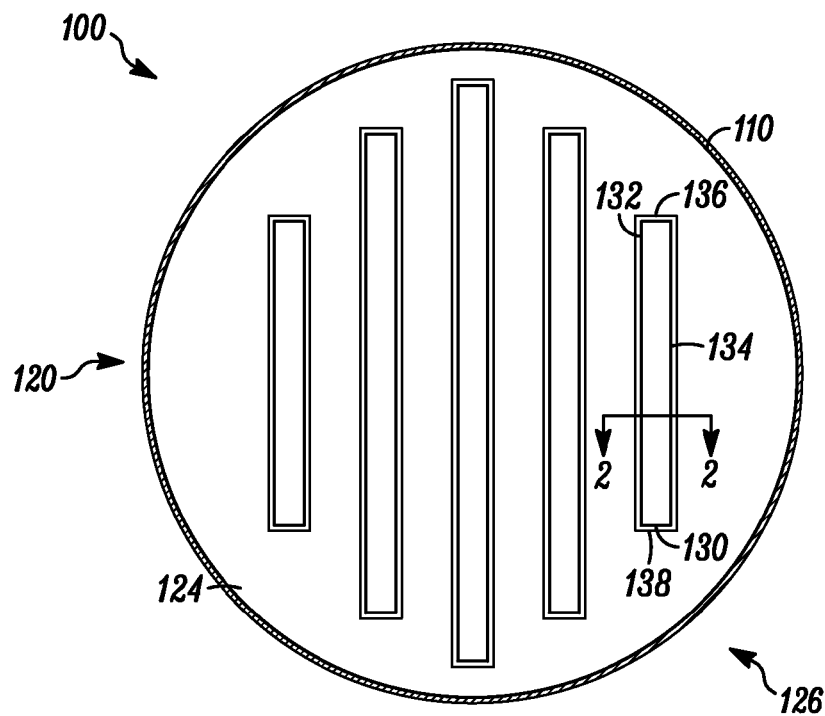
FIG. 1 is a cross-sectional view of a gas-liquid contacting apparatus revealing a top, plan view of an exemplary device.
Figure 2:
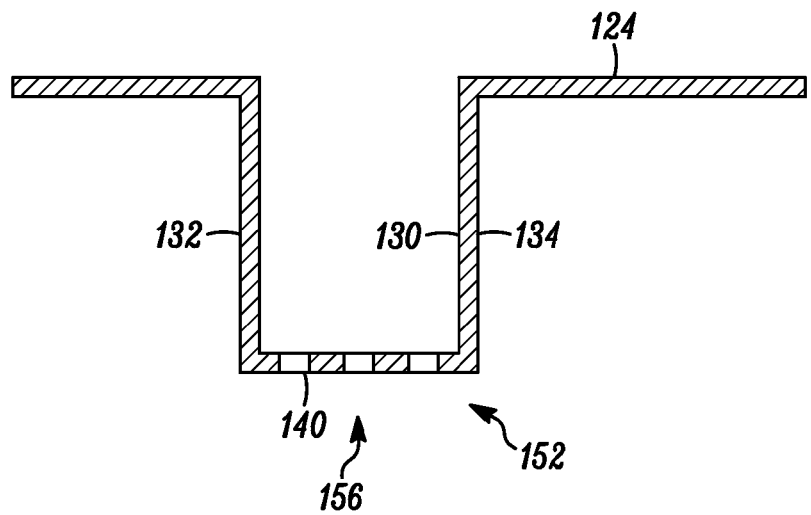
FIG. 2 is a cross-sectional, elevational view along line 2-2 of FIG. 1 of an exemplary downcomer.

Referring to FIGS. 1 and 2, a device 120 of a gas-liquid contacting apparatus 100 is depicted. Typically, the gas-liquid contacting apparatus 100 is a fractional distillation column 110. In FIG. 1, a cross-section of the column 110 is depicted with the column 110 having a circular periphery. Although the apparatus 100 in this exemplary embodiment is a fractional distillation column 110, the apparatus 100 can be other gas-liquid contacting apparatuses, such as an absorber or stripper. The gas-liquid contacting apparatus 100 can include one or more devices 120.

The device 120 can include a gas-liquid contacting tray or deck 124 and a plurality of downcomers 126. Although not depicted, it should be understood that the gas-liquid contacting tray 124 can form a plurality of perforations, typically circular, and optionally directing slots for permitting the passage of gas and/or liquid for the creation of froth to facilitate, e.g., heat and mass transfer between the gas and liquid. The plurality of downcomers 126 can be any shape, but in this exemplary embodiment the downcomers 126 are prisms. Moreover, the plurality of downcomers 126 can be associated with other equipment, such as baffles and liquid directing spouts. The plurality of downcomers 126 can include a downcomer 130, which can be representative of the downcomers 126 in this exemplary embodiment.

The downcomer 130 can include first and second spaced apart side walls 132 and 134 extending the length of the downcomer 130 coupled at respective ends with a first end wall 136 and a second end wall 138. A member 140, such as a bottom member or plate 140, can be coupled to the first and second side walls 132 and 134 and the first and second end walls 136 and 138. The bottom plate 140 can have alternating first and second sections along the length of the downcomer 130 with the first section 156 forming one or more holes 152 permitting the passage of liquid there-through, and the second section (not depicted) being substantially impregnable to liquid penetration.

Often, the fractional distillation column 110 includes several devices 120 stacked vertically in the column 110. The plurality of downcomers 126 of each device 120 is generally placed horizontally in the column 110. As viewed from above, the downcomers 126 of each device 120 may be skewed, typically 90°, from the downcomers 126 of the device 120 above and/or below in the column 110. Alternatively, the downcomers 126 at each level may be aligned with one or more other downcomers 126 at different levels. Exemplary devices 120 at least some of which are depicted in stacked arrangements are disclosed in U.S. Pat. Nos. 5,382,390; 6,131,891; 7,232,115 B2; 2007/0137482 A1; and 2007/0126134 A1.

Figure 3:
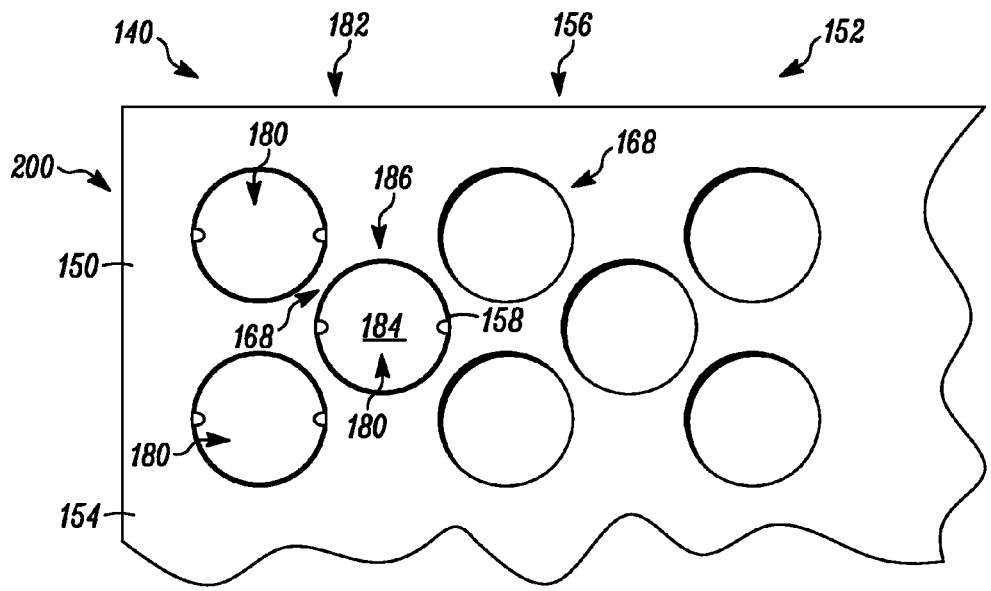
FIG. 3 is a top, plan view of a portion of a section of an exemplary bottom member of a downcomer.

Referring to FIG. 3, a portion of the first section 156 of the bottom plate 140 is depicted. Generally, the bottom plate 140 can include a non-breakable portion 150 and a breakable portion 180. The non-breakable portion 150 can include a web 154 forming one or more holes 152 including a first hole 158. In this exemplary embodiment, each of the one or more holes 152 can form a circular shape 168, although any shape may be formed. The breakable portion 180 can include one or more discrete regions 182 including a first discrete region 184 having a perimeter 186 and secured by a plurality of tabs 200. In some preferred embodiments, the one or more discrete regions 182 may be referred to as "a knock-out piece or pieces", and such terminology may be used hereinafter.

The bottom plate 140 can be manufactured from any suitable material, typically depending on the hydrocarbon processing conditions. Exemplary materials can include carbon steel, stainless steel, titanium, or a stainless steel alloy sold under the tradename MONEL by Inco Alloys International, Inc. of Huntington, W. Va. The bottom plate 140 can be manufactured with any suitable punch or stamp press. Particularly, a material having a thickness of about 0.34 cm can be punched with a displacement ranging from greater than about 50%-less than about 100%. The displacement of a material generally means that after the material is punched, a portion of the material is pushed below its bottom edge. For a sheet metal material 0.34 cm thick, a 50% displacement would result in about 0.17 cm of metal protruding below the bottom edge of the sheet metal. Preferably, the displacement is about 75%, to allow the manual removal of the discrete regions but sufficiently sturdy to hold the regions in place during hydrocarbon operations. However, the desired displacement can vary depending on the type and thickness of material. Typically, the punching action creates one or more tabs that secure the discrete regions within respective holes.

Figure 6:
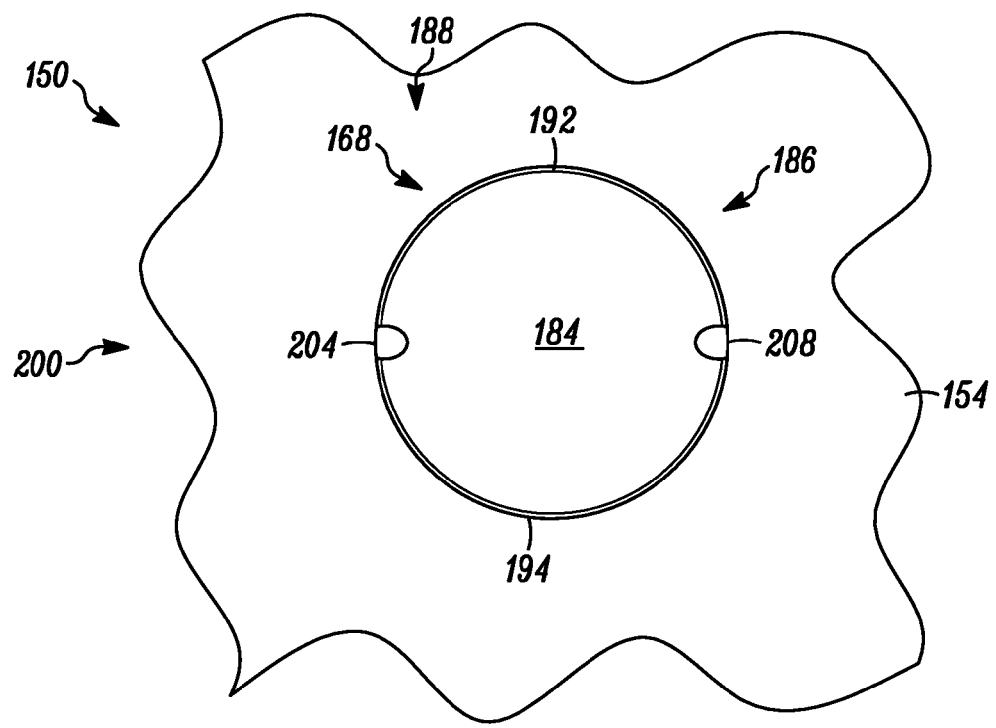
FIG. 6 is a top, plan view of an exemplary discrete region in an exemplary hole.

Referring to FIGS. 3 and 6, the web 154 can form the first hole 158 generally having the circular shape 168. Inside the hole 158, the first discrete region 184 can include the perimeter 186, which in this exemplary embodiment is circular, although any shape may be used that corresponds with the shape of the hole 158. The perimeter 186 of the first discrete region 184 may form one or more score lines, preferably a plurality of score lines 188, with the web 154 of the non-breakable portion 150. Generally, the perimeter 186 and the web 154 can form a first score line 192 and a second score line 194. The plurality of tabs 200, namely a first tab 204 having a first tab length and a second tab 208 having a second tab length can secure the first discrete region 184 within the perimeter 186. In this preferred embodiment, the first and second tab lengths are angular due to the circular shape of the hole 158 and the region 184. Generally, the tabs 204 and 208 can have a length along the circumference of the perimeter 186. Typically, the length ratio of the total tab length to the perimeter circumference is about 0.03:1-about 0.4:1, and preferably about 0.05:1-about 0.2:1. However, it should be understood that any number and/or length of tabs may be used.

Figure 7:
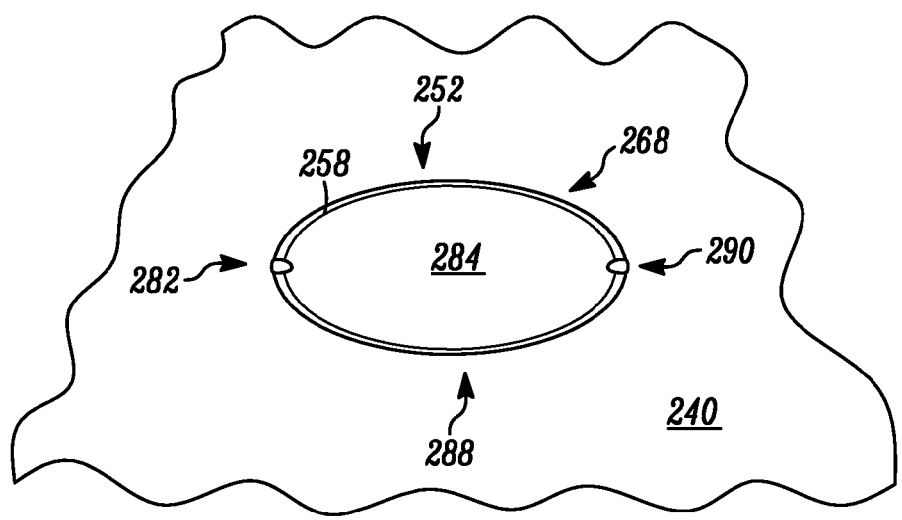
FIG. 7 is a top, plan view of another exemplary discrete region in another exemplary hole.

Referring to FIG. 7, a portion of another exemplary first member 240 can have another version of one or more holes 252. Typically, the one or more holes 252 can be a first hole 258 having an oval shape 268. In addition, one or more discrete regions 282, particularly a first discrete region 284, can have an oval shape 288 secured to the first member 240 by a plurality of tabs 290.

Figures 4, 5:
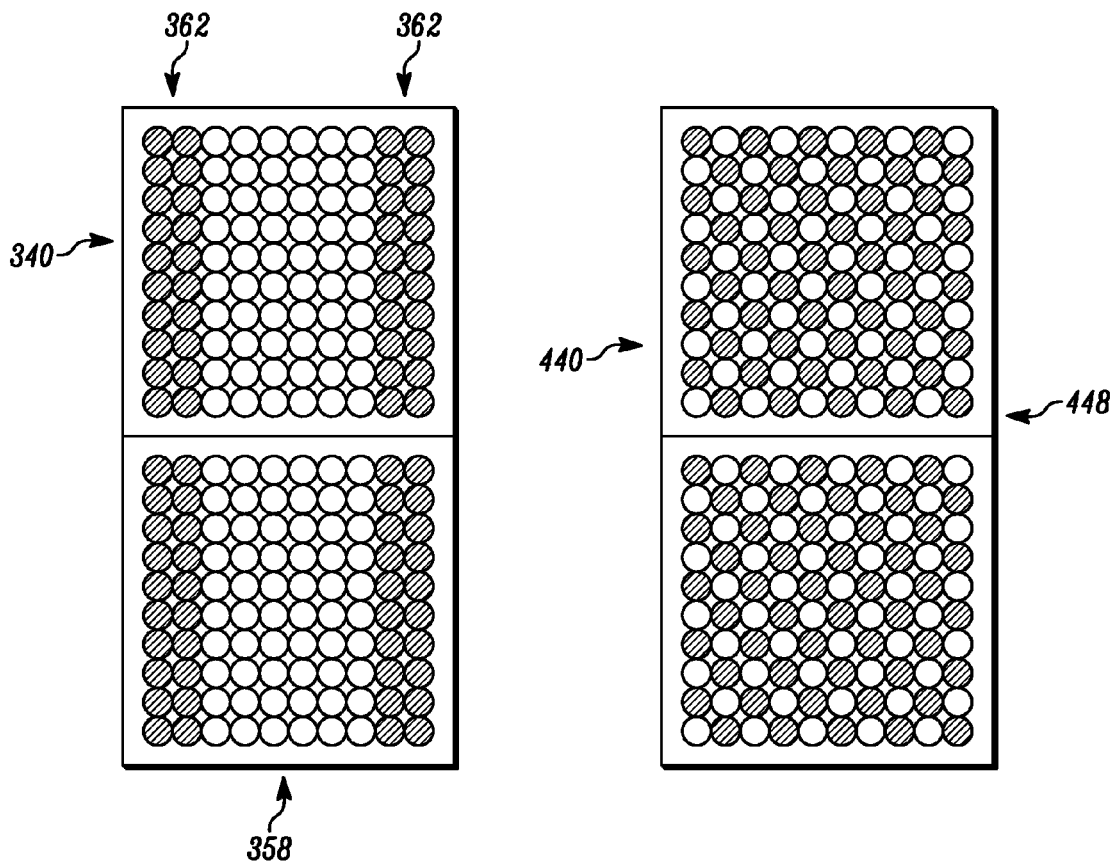
FIG. 4 is a top, plan view of another exemplary bottom member.
FIG. 5 is a top, plan view of yet another exemplary bottom member.

Referring to FIGS. 4 and 5, at least a portion of other exemplary members 340 and 440 are depicted. These other members 340 and 440 depict optional patterns of bottom plate members having holes covered by one or more discrete regions. Particularly, in the exemplary member 340, an inner region 358 can be uncovered while an outer region 362 can be covered by one or more discrete regions. In the member 440, the holes and the discrete regions can be intermingled 448. As capacity demand increases, these discrete regions can be removed as desired.

Figure 8:
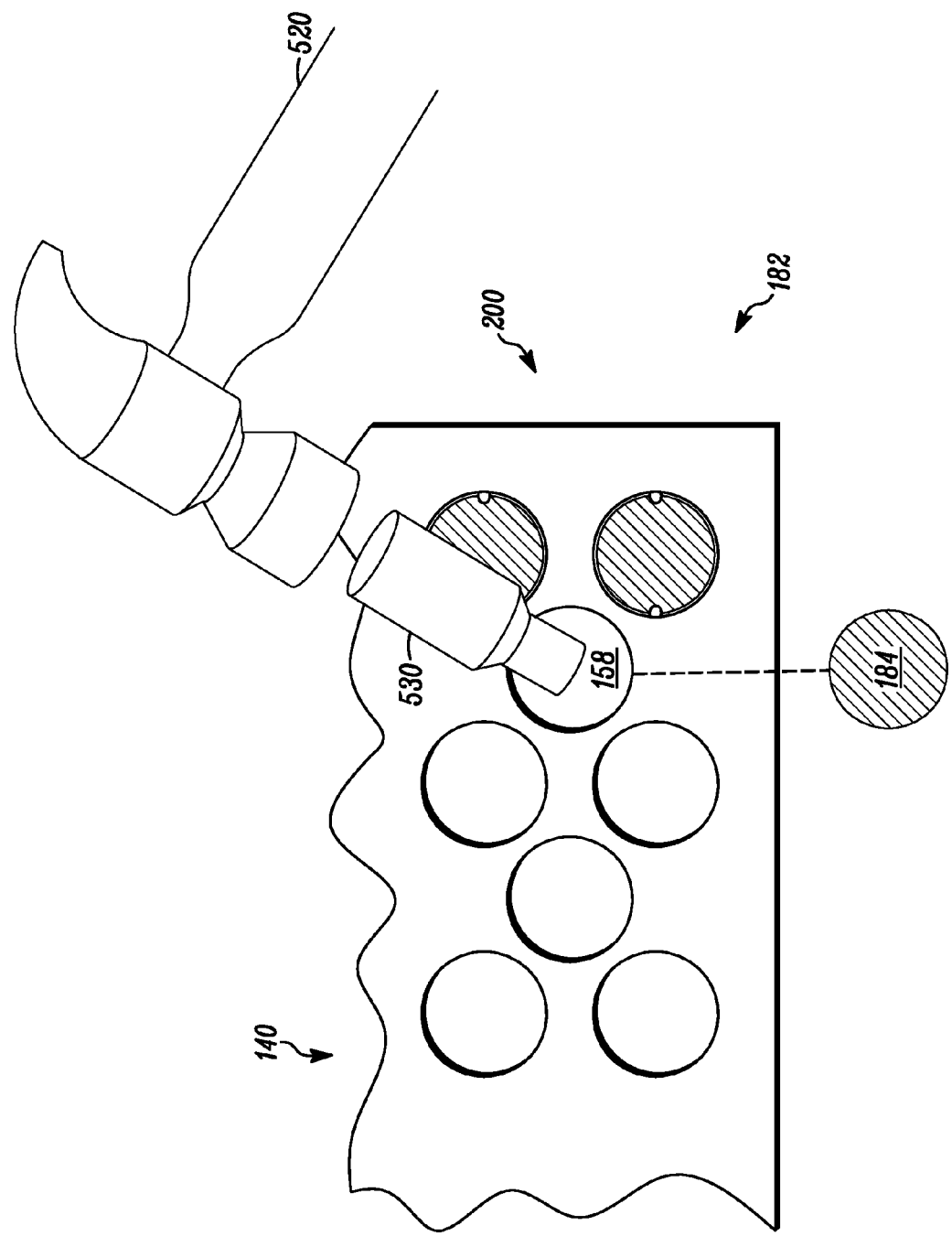
FIG. 8 is a perspective view of an exemplary striking member removing the exemplary discrete region.

An exemplary modification to the bottom plate 140 is depicted in FIG. 8. Particularly, the discrete region 184 as depicted in FIG. 3 is removed with a striking member 520, such as a hammer or mallet, optionally, in conjunction with a punching member 530, such as a punch, chisel, or screwdriver. In FIG. 8, a hammer 520 and a punch 530 are depicted. The bottom plate 140 can include the one or more discrete regions 182 attached with the plurality of tabs 200. Thus, the bottom plate 140 can easily be altered to increase liquid flow through the downcomer 130 by removing the at least one discrete region or the knock-out piece 184 revealing the hole 158 with the hammer 520 and the punch 530.

As an example, referring to FIGS. 6 and 8, the bottom plate 140 can have a thickness of about 0.267 cm and include a carbon steel having a tensile strength of about 400 megaN/m$^2$. The tabs 204 and 208 can have a combined area of about 0.084 cm² and each can have a length of about 0.32 cm. If the first discrete region 184 is displaced about 50%, the force to remove the region 184 can be about 3,500 N. If the first discrete region 184 is displaced about 75%, the force to remove the region 184 can be about 1,800 N.

The knock-out pieces 182 are secured sufficiently to not be inadvertently removed during hydrocarbon processing operations, yet easily removed by manual force to speed alterations during downtimes, such as maintenance overhauls. This efficiency can help bring a unit back to operation and minimize downtime.

Although the knock-out pieces have been described in conjunction with a bottom plate of a downcomer, it should be understood that such knock-out pieces may be used in other fluid barriers, such as a distillation tray or deck. Thus, the knock-out pieces may be used to easily permit increasing the capacity of equipment in other hydrocarbon operations, particularly where it is desired to increase the flow of a fluid, desirably a liquid, passing through a solid barrier.

EXAMPLES

The following examples are intended to further illustrate the disclosed embodiments. These illustrations of the embodiments are not meant to limit the claims to the particular details of these examples. These examples can be based on engineering calculations and actual operating experience with similar processes.

Comparison Example 1

Two about 0.19 cm thick plates with each plate forming 60 holes and each hole having a diameter of about 1.9 cm are placed in a downcomer. A V-shaped momentum damping plate is also placed in the downcomer. A liquid is placed in the downcomer at heights of 5 cm, 15 cm, and 25 cm. At each of these heights, the liquid passes through the downcomer.

Example 1

Two about 0.19 cm thickness plates with holes occupied by discrete regions are placed inside a downcomer. No momentum damping plate is inserted in the downcomer. The liquid is provided at varying heights of 5 cm, 15 cm, and 25 cm in the downcomer. The total liquid flow through the trough is measured. After placing the liquid in the trough, no liquid leakage is seen passing through the plate at any of the heights.

Example 2

Two about 0.19 cm thick plates with each plate forming 60 holes and each hole having a diameter of about 1.9 cm are placed in a downcomer except some holes are occupied by knock-out pieces in a pattern as depicted in FIG. 4. A V-shaped momentum damping plate is also placed in the downcomer. A liquid is placed in the downcomer at heights of 5 cm, 15 cm, and 25 cm. At each height, the liquid passes through the unoccupied holes, but not through the knock-out pieces.

Example 3

Two about 0.27 cm thick plates with each plate forming 60 holes and each hole having a diameter of about 1.9 cm are placed in a downcomer except some holes are occupied by knock-out pieces in a pattern as depicted in FIG. 5. Tabs holding the one or more knock-out pieces are placed face-up inside the downcomer. A V-shape momentum damping plate is placed in the downcomer. A liquid is placed in the downcomer at heights of 5 cm, 15 cm, and 25 cm. At each height, the liquid passes through the unoccupied holes, but not through the knock-out pieces.

Example 4

Four carbon steel plates having one or more discrete regions occupying all the holes of a downcomer are left outside for a period of time. Particularly, two of the bottom plates are left outside for three months and two are left out for six months. In either instance, the holes covered by one or more discrete regions maintain their integrity and are removable with a hammer.

Without further elaboration, it is believed that one skilled in the art can, using the preceding description, utilize the present invention to its fullest extent. The preceding preferred specific embodiments are, therefore, to be construed as merely illustrative, and not limitative of the remainder of the disclosure in any way whatsoever.

From the foregoing description, one skilled in the art can easily ascertain the essential characteristics of this invention and, without departing from the spirit and scope thereof, can make various changes and modifications of the invention to adapt it to various usages and conditions.

The invention claimed is:

1. An apparatus for gas-liquid contacting, comprising:
   a gas-liquid contacting tray; and
   a downcomer coupled to the gas-liquid contacting tray wherein the downcomer comprises:
      a member, comprising:
         a non-breakable portion; and
         a breakable portion adapted for removal by an application of an effective amount of force for creating one or more holes,
      wherein said apparatus comprises a fractional distillation column.

2. The apparatus according to claim 1, wherein the non-breakable portion forms one or more holes, and the breakable portion comprises one or more discrete regions.

3. The apparatus according to claim 1, wherein the non-breakable portion comprises a web surrounding each of the one or more holes and the one or more discrete regions.

* * * * *